United States Patent
Barak (10) Patent No.: US 10,554,672 B2
(45) Date of Patent: *Feb. 4, 2020

(54) CAUSALITY IDENTIFICATION AND ATTRIBUTIONS DETERMINATION OF PROCESSES IN A NETWORK

(71) Applicant: Palo Alto Networks, Inc., Santa Clara, CA (US)

(72) Inventor: Gil Barak, Raanana (IL)

(73) Assignee: PALO ALTO NETWORKS INC., Santa Clara, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/398,070

(22) Filed: Jan. 4, 2017

(65) Prior Publication Data
US 2017/0195350 A1 Jul. 6, 2017

Related U.S. Application Data

(60) Provisional application No. 62/274,799, filed on Jan. 5, 2016.

(51) Int. Cl.
*H04L 29/06* (2006.01)

(52) U.S. Cl.
CPC .............................. *H04L 63/1416* (2013.01)

(58) Field of Classification Search
CPC ................................................... H04L 63/1416
USPC .......................................................... 726/23
See application file for complete search history.

(56) References Cited

U.S. PATENT DOCUMENTS

| | | | |
|---|---|---|---|
| 7,398,532 B1 * | 7/2008 | Barber | G06F 21/53 718/100 |
| 8,453,244 B2 * | 5/2013 | Dai | G06F 21/577 713/187 |
| 2016/0357958 A1 * | 12/2016 | Guidry | G06F 21/53 |

* cited by examiner

*Primary Examiner* — Longbit Chai
(74) *Attorney, Agent, or Firm* — Gilliam IP PLLC (57) ABSTRACT

Processes in a network which cause and are attributable to security incidents are identified. Processes which are initiated on devices in an enterprise network at boot of the devices are identified. The enterprise network is continuously monitored to collect data about processes which were initiated or spawned on devices in the enterprise network after the boot of the devices. Each process is determined to be a major system process, a minor system process, or a non-system process based, at least in part, on the collected data which indicates associations among the processes. Based on matching a security incident alert to a first of the processes, it is determined whether the first process is a non-system process to validate the security incident alert.

27 Claims, 8 Drawing Sheets

CAUSALITY IDENTIFICATION AND ATTRIBUTIONS DETERMINATION OF PROCESSES IN A NETWORK

CROSS-REFERENCE TO RELATED APPLICATIONS

This Application claims the benefit of U.S. Provisional Application Ser. No. 62/274,799 filed Jan. 5, 2016, the entire contents of which are incorporated herein by reference in their entirety.

BACKGROUND

1. Field

The disclosure generally relates to data security, and more specifically, to a system and methods for causality identification and attributions determination of processes in a network.

2. Description of Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

As organizations and enterprises get bigger, they are more and more exposed to malicious attacks. Kaspersky® reports detections of over 300,000 different malware variants in a single day. The United Kingdom government reports over 100,000 cyber-attacks on British companies every day.

In order to identify such attacks, a number of different anti-virus applications are currently available. Such anti-virus applications force security teams of large enterprises to manage thousands of new alerts every day, when responding to a single alert may take days, weeks and sometimes months.

These applications must be deployed into a computerized environment and attempt to identify malicious activity within the network. Other solutions may also be known. For example, anti-virus solutions that detect and remove known viruses by identifying "signatures" of such viruses may be available.

The majority of these solutions rely upon a basic engine that searches suspect files for the presence of predetermined virus signatures. However, these related art solutions for identifying security incidents are not effective enough and malicious activity may go undetected.

In the view of the shortcoming of related art, it would be advantageous to provide an efficient solution for detecting security incidents in a computerized environment by automatically validating security alerts. It would further be advantageous if such solution shall further enable a real-time assessment of damages resulted from a security incident.

SUMMARY

Exemplary implementation of the disclosed teachings overcome the above disadvantages and other disadvantages not described above. Also, an exemplary implementation of the disclosed teachings is not required to overcome the disadvantages described above, and an exemplary implementation of the disclosed teachings of the present inventive concept may not overcome any of the problems described above.

In some exemplary implementation of the disclosed teachings, a computerized method for causality identification and attributions determination of processes in a network, includes receiving a request to identify one or more process initiated in an enterprise's system, and identifying one or more process initiated in an the enterprise's system. Additionally, the computerized method includes analyzing one or more process, and determining whether the type of the process is a) a major system process, b) a minor system process or c) a non-system process. Finally, the computerized method includes continuously monitoring one or more process, and generating analytics for the processes.

In other exemplary implementation of the disclosed teachings, an apparatus for causality identification and attributions determination of processes in a network, includes an interface to an enterprises' system, at least one non-transitory memory configured to store instructions, and at least one processor configured to read the instructions and operate as instructed by the instructions. The instructions include receive instructions that receive a request to identify at least one process initiated in an enterprise's system, mining instructions that identify the at least one process initiated in the enterprise's system, analyze instructions that analyze the at least one process, determination instructions that determine a type of the at least one process, where the type could be a) major system process, b) a minor system process or c) a non-system process, monitor instructions that continuously monitor the at least one process, and generate instructions that generate analytics respective of the at least one process.

In yet other exemplary implementation of the disclosed teachings, a non-transitory computer readable storage medium, implemented by at least one processor allows a computer to receive a request to identify at least one process initiated in an enterprise's system, and identify the at least one process initiated in the enterprise's system. Additionally, the non-transitory computer readable storage medium allows a computer to determine a type of the at least one process, where the type could be a) major system process, b) a minor system process or c) a non-system process, analyze the at least one process, and continuously monitor the at least one process, generate analytics respective of the at least one process.

BRIEF DESCRIPTION OF THE DRAWINGS

The foregoing and other objects, features, and advantages of the disclosed teachings will be apparent from the following detailed description taken in conjunction with the accompanying drawings, in which.

DETAILED DESCRIPTION

Below, exemplary implementations of the teachings will be described in detail with reference to accompanying drawings so as to be easily realized by a person having ordinary knowledge in the art. The exemplary implementations may be embodied in various forms without being limited to the exemplary implementations set forth herein. Descriptions of well-known parts are omitted for clarity, and like reference numerals refer to like elements throughout.

It is important to note that the exemplary implementations disclosed by the present application are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

A system is connected to a plurality of user devices coupled to an enterprise's network. The system continuously collects and stores forensic data related to the enterprise's network. The system analyses the collected data. Based on the analysis, the system is able to differentiate between different processes initiated in the enterprise's network, i.e., major system processes, minor system processes and non-system processes. The differentiation between the different processes enables the system to monitor new processes and determine whether they are associated to any of the previously identified processes. Such determination enables the system to provide analytics respective of each process initiated in the enterprise's network.

Figure 1:
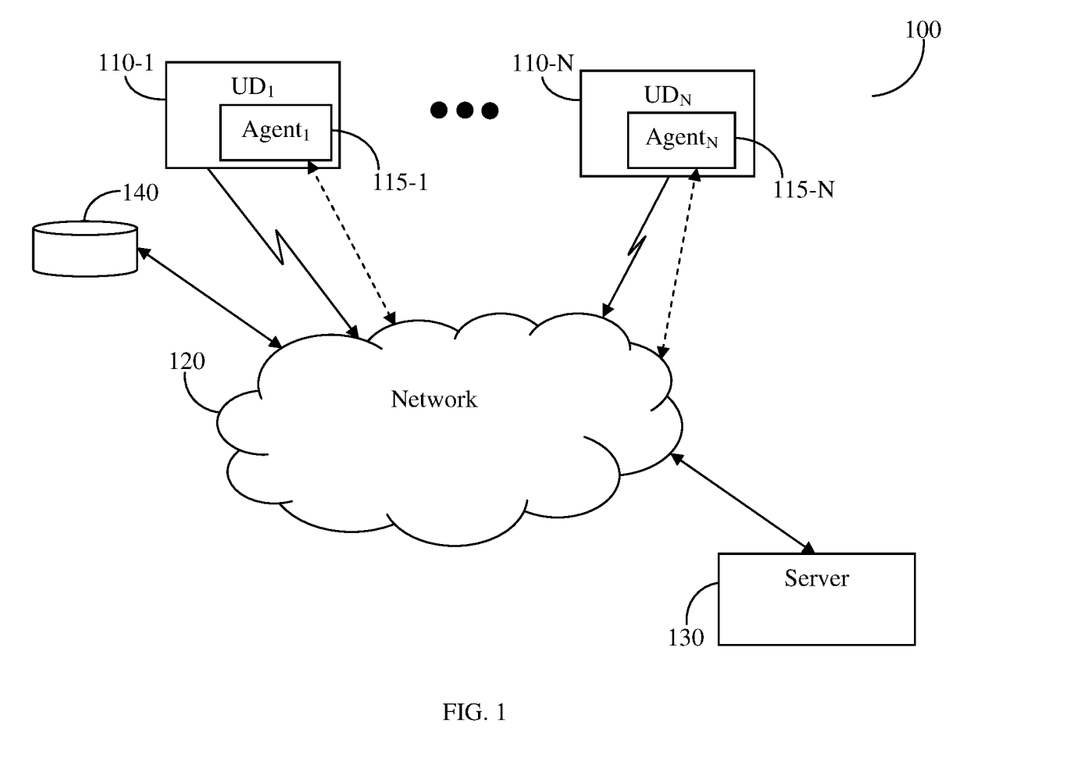
FIG. 1—is a block diagram of a network system used to describe the operation of the system according to an exemplary implementation of the disclosed teachings.

FIG. 1 depicts an exemplary and non-limiting block diagram used to describe the operation of the system 100 according to an exemplary implementation. A plurality of user devices (UD) 110-1 through 110-N (collectively referred hereinafter as user devices 110 or individually as a user device 110, merely for simplicity purposes), where N is an integer equal to or greater than 1, are communicatively connected to an enterprise's network 120. The user devices 110 can be, but are not limited to smart phones, mobile phones, laptops, tablet computers, wearable computing devices, personal computers (PCs), a combination thereof and the like. The network 120 may comprise the likes of busses, local area network (LAN), wide area network (WAN), metro area network (MAN), the worldwide web (WWW), the Internet, as well as a variety of other communication networks, whether wired or wireless, and in any combination, that enable the transfer of data between the different elements of the system 100.

A server 130 is further connected to the network 120. The server 130 is configured to identify processes initiated in the network 120 and continuously monitoring their operation. The server 130 is further configured to analyze the processes and determine the type of each process. A type of process may be a major system process, a minor system process and a non-system processes. System processes are any type of processes initiated at the boot of a user device 110. System processes that are fatal for the operation of the user device 110 are considered major system processes. System processes that initiated at the boot of the user device 110 and are not fatal for the operation of the user device 110 are considered minor system processes. This differentiation between the processes enables generation of analytics respective of each process, optimization of the performance of the system 100, and furthermore, identification of security incident as further described herein below.

Types of processes spawned by previous processes are too being determined by the server 130 based on their source, i.e., a process spawned by a major process, which is not a system process is considered a new, non-system process. System processes spawned by a major or a minor system process are considered part of the spawning process, i.e., a major system process or a minor system process respectively. All processes spawned by non-system processes are considered continuous and therefore, part of the spawning non-system process. A process is considered by the server 130 terminated only when the user device 110 resets or all initiated and spawned processes terminated. In case a newly spawned process has no source, it shall be determined by the server 130 as a security incident. According to an exemplary implementation, the server 130 is further configured to receive alerts from a security information and event management (SIEM) system associated with suspicious events. The alerts can then be matched by the server 130 to processes associated therewith for determination of whether there is a security incident and to verify false positives.

According to an exemplary implementation, the server 130 analyzes one or more processes initiated through the network 120 by the one or more user devices 110. The server 130 then determines, respective of the analysis, a type of each of the one or more processes, i.e., whether it is a major system process, a minor system process or a non-system process. The server 130 then continuously monitors the processes and generates analytics respective thereof. The analytics may then be stored in a database 140 for further processing.

Figure 2:
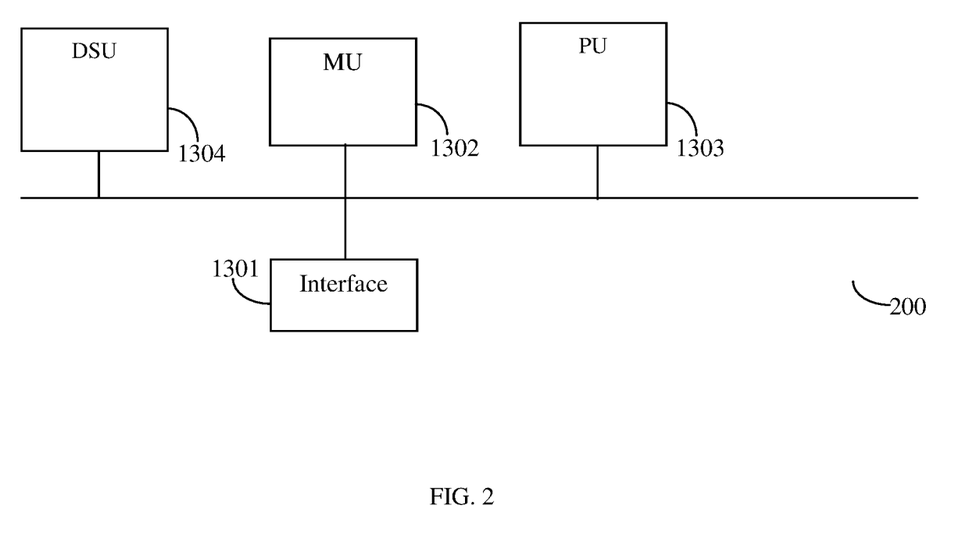
FIG. 2—is a schematic diagram of an apparatus used to describe the operation of the system according to an exemplary implementation of the disclosed teachings.

FIG. 2 is an exemplary and non-limiting schematic diagram 200 of the server 130 according to an exemplary implementation. The server 130 includes an interface 1301 to the network 120 by which the server 130 sends and receives data over the network 120. The server 130 further includes a mining unit (MU) 1302 by which the server 130 identifies a plurality of processes initiated through the network 120 by one or more user devices 110 as further described hereinabove. According to this exemplary implementation, the MU 1302 includes the plurality of agents 115 installed on the user devices 110. The processes are then analyzed by a processing unit (PU) 1303 to determine a type of each process. Optionally, the server 130 further includes a data storage unit (DSU) 1304 for storing the types of each process and analytics respective thereof.

Figure 3:
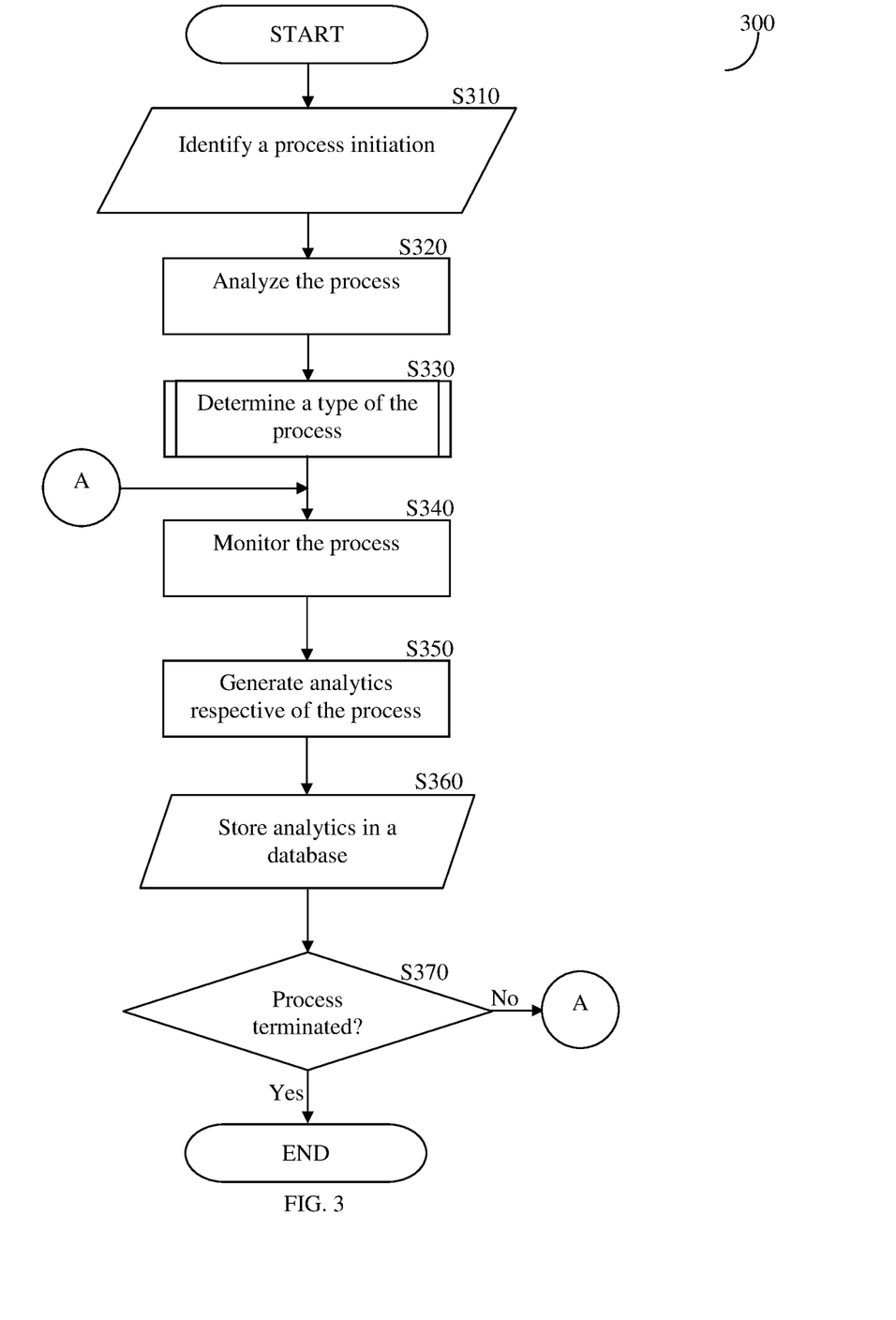
FIG. 3—is a flowchart describing a method for causality identification and attributions determination of processes in a network according to an exemplary implementation of the disclosed teachings.

FIG. 3 is an exemplary and non-limiting flowchart 300 describing a method for determining types of processes and generating analytics respective thereof according to an exemplary implementation. In S310, the operation starts when at least one process initiated in the network 120 by a user device, for example, the user device 110, is identified by the server 130.

According to an exemplary implementation, the MU 1302 continuously monitors and collects data and/or metadata respective of all events which occurred in an operating system of a UD 110-1. The PU 1303 then analyzes the events. Respective of the analysis, the PU 1303 is configured to generate a causality chain for the at least one event. The causality chain comprises all the threads that attribute to the at least one event in a chronological order. The PU 1303 then uses the causality chain to identify a main thread that led to the event, i.e., the thread that started the process that ended at the at least one event. The PU 1303 then determines whether a malicious process is associated with the main thread. In case a determination was made that a malicious process is associated with the main thread, the process is marked by the PU 1303 as infected. Data respective of the process may then be sent for storage in the DSU 1304 for further processing.

FIG. 3 is an exemplary and non-limiting flowchart 300 describing a method for determining types of processes and generating analytics respective thereof according to an exemplary implementation. In S310, the operation starts when at least one event occurred in the network 120 by a user device, for example, the UD 110-1, is identified by the server 130.

In S320, the process is analyzed as further described hereinabove. In S330, respective of the analysis, a type of the process is determined. S330 is further described herein below with respect of FIG. 4.

In S340, the process is continuously monitored by the server 130. In S350, one or more analytics are generated respective of the monitoring. In S360, the generated analytics are sent for storage in, for example, the database 140. In S370, it is checked whether the process terminated and if so, execution terminates, otherwise, execution continues with S340.

Figure 4:
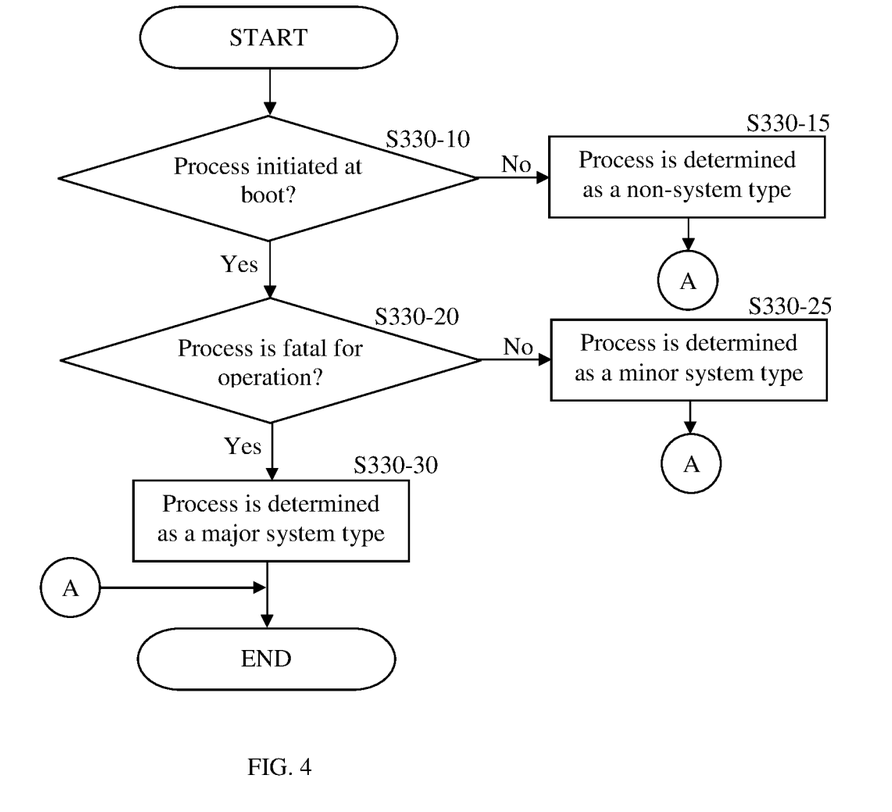
FIG. 4—is a flowchart describing a method for identifying a process type in a network according to an exemplary implementation of the disclosed teachings.

FIG. 4 is an exemplary and non-limiting flowchart 330 describing a method for determining a type of a process according to an exemplary implementation. In S330-10, it is checked whether the process was initiated in the boot of the user device 110 and if so, execution continues with S330-20; otherwise, execution continues with S330-15.

In S330-15, the process is determined as a non-system type and execution terminates. In S330-20 it is checked whether the process is fatal for the user device 110 operation and if so, execution continues with S330-30; otherwise, execution continues with S330-25.

In S330-25, the type of the process is determined as a minor system process and execution terminates. In S330-30, the process is determined as a major system process and execution terminates.

Figure 5:
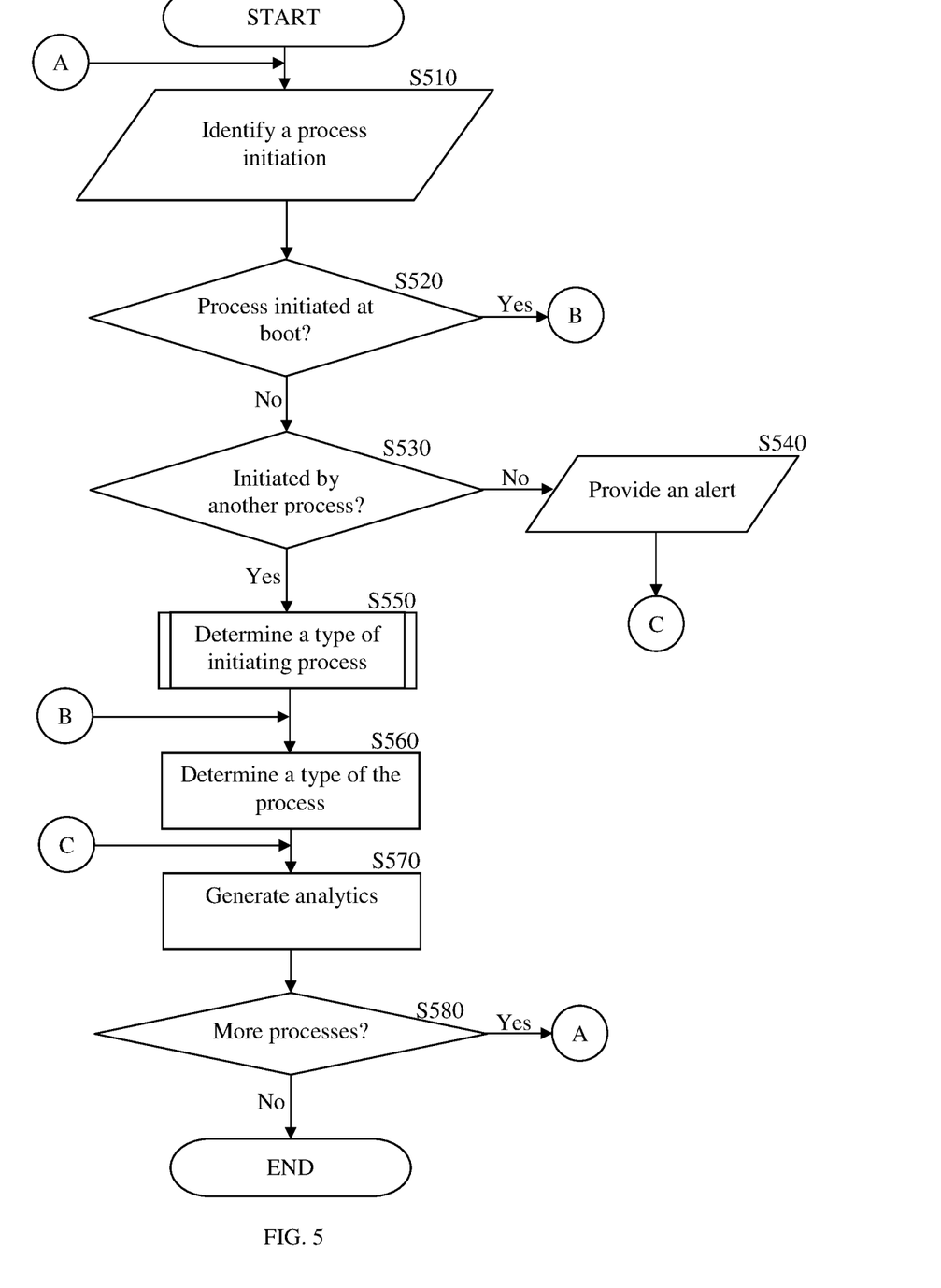
FIG. 5—is a flowchart describing a method for identifying security incidents respective of processes' type according to an exemplary implementation of the disclosed teachings.

FIG. 5 is an exemplary and non-limiting flowchart 500 describing a method for identifying security incidents respective of processes' type according to an exemplary implementation. In S510, the operation starts when at least one process initiation is identified, for example a user device 110 communicatively coupled to the network 120. In S520, it is checked whether the process was initiated at the boot of the system and if so, execution continues with S560; otherwise, execution continues with S530. In S530, it is checked whether the process was initiated by another process and if so, execution continues with S550; otherwise, execution continues with S540.

In S540, an alert is provided respective of a security incident. As the process was not initiated at the boot nor was initiated by another process, it is determined as suspicious and therefore the alert is provided. In S550, a type of the initiating process is determined as further described hereinabove with respect of FIG. 4.

In S560, the type of the initiated process is determined. In S570, analytics respective of the file initiation and/or type are generated. In S570, the analytics may further be sent for storage in, for example, the database 140. In S580, it is checked whether additional processes were initiated and if so, execution continues with S510; otherwise, execution terminates.

Figure 6:
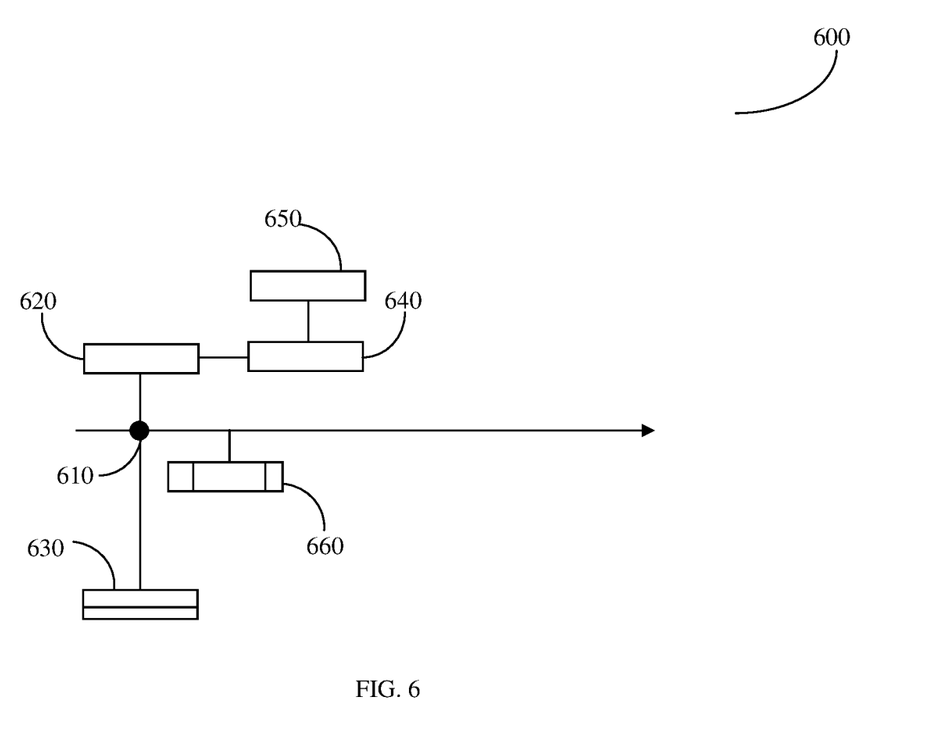
FIG. 6—is a schematic diagram of a determination of processes type according to an exemplary implementation of the disclosed teachings.

FIG. 6 depicts an exemplary and non-limiting diagram 600 simulating determination of a process' type according to an exemplary implementation. As shown in the diagram 600, at the boot 610, two processes 620 and 630 are initiated. Therefore, both of the processes 620 and 630 are considered system processes, 620 is a major system process as it is fatal for the operation of the system and 630 is a minor system process as its operation is not fatal for the operation of the system. Process 640 is not a system process, although initiated by the system process 620 and therefore it is considered a new flow. Process 650 which was initiated by the non-system process 640, is determined as same flow of the process 640. Process 660 which was initiated following the boot does not have an initiating process and therefore is considered suspicious.

Figure 7:
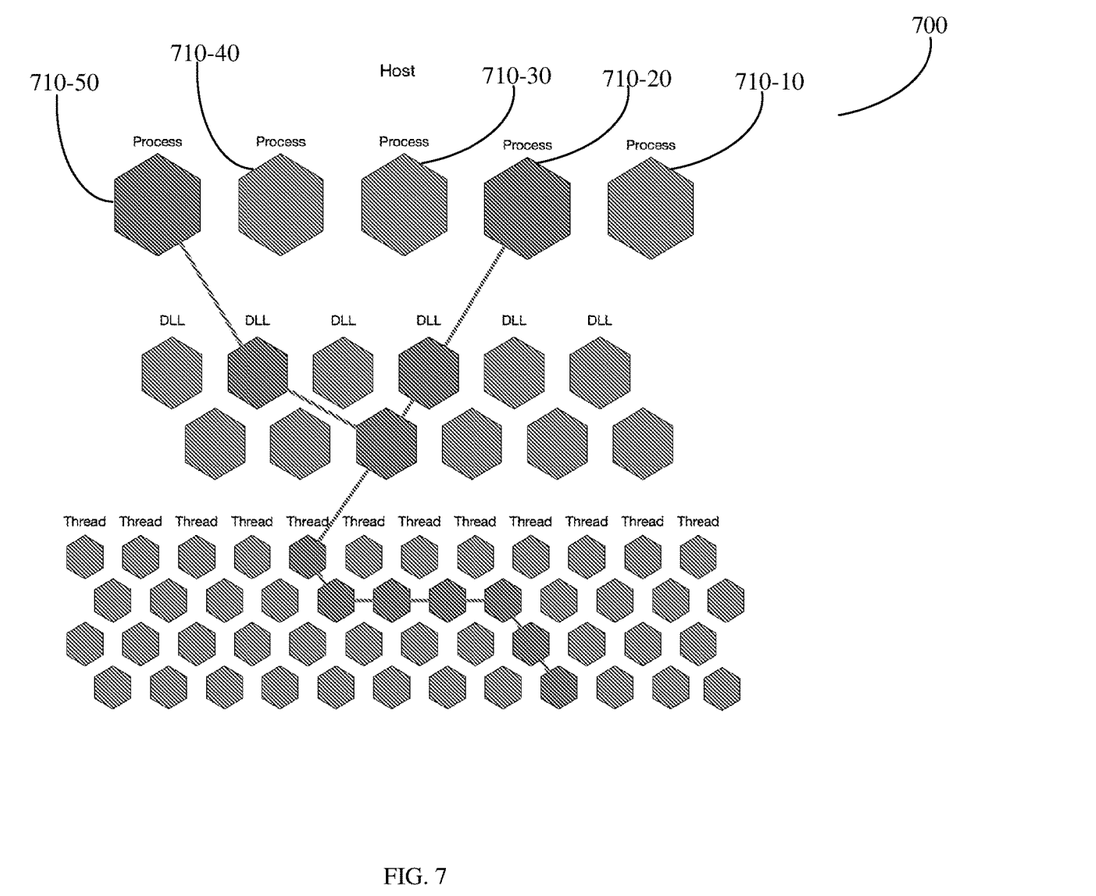
FIG. 7—is a simulation of a determination of processes type according to an exemplary implementation of the disclosed teachings.

FIG. 7 depicts an exemplary and non-limiting diagram 700 simulating identification and marking of processes throughout their execution in an enterprise's network according to an exemplary implementation. As shown in the diagram 700, at the boot of a host, five processes 710-10 through 710-50 are initiated. The server 130 monitors the processes and determines both DLLs and threads associated with the respective process.

Figure 8:
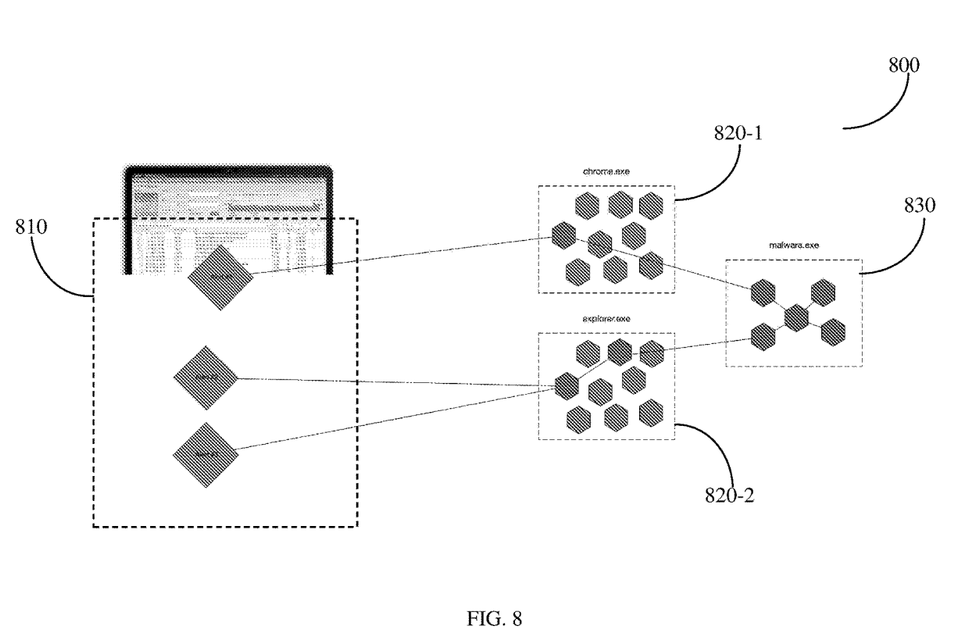
FIG. 8—is a simulation of SIEM alerts validation according to an exemplary implementation of the disclosed teachings.

FIG. 8 depicts an exemplary and non-limiting diagram 800 of validating alerts received from STEM system according to an exemplary implementation. A plurality of alerts 810 are received by the server 130 from at least one STEM system. The plurality of alerts are then matched to associated processes that spawned in Google Chrome® 820-1 and Internet Explorer® 820-2. The processes are then analyzed by the server 130 respective of the processes' type and a determination of malware 830 is made respective thereof.

The principles of the disclosure are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art and are to be construed as being without limitation to such specifically recited examples and conditions. Moreover, all statements herein reciting principles, aspects, and exemplary implementations of the disclosed teachings, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other exemplary implementations of the disclosed teachings may be achieved without departing from the scope of the disclosed teachings. All such exemplary implementations are included herein. The scope of the disclosed teachings should be limited solely by the claims thereto.

What is claimed is:

1. A method for causality identification and attributions determination of processes in an enterprise network comprising:
   identifying the processes initiated on devices in the enterprise network after boot of the devices;
   continuously monitoring the enterprise network to collect data about the identified processes initiated or spawned on the devices in the enterprise network and to determine dynamic link libraries (DLLs) and threads associated with respective processes from the identified processes;
   based, at least in part, on analysis of the collected data indicating associations among the identified processes, determining a type of each process as a major system process, a minor system process, or a non-system process; and
   based on matching a security incident alert to a first of the identified processes, determining whether the first process is a non-system process to validate the security incident alert; and
      based on validating the security incident alert, marking a subset of DLLs and a subset of threads on a first device that hosts the first process as malicious based on determining that the subset of DLLs and subset of threads are associated with the first process, wherein the first process was initiated following the boot of the first device and was not initiated by a second process.

2. The method of claim 1 further comprising terminating the first process, based on a determination that the first process is a non-system process, after a first of the devices resets, wherein the first process was initiated on the first device.

3. The method of claim 1 further comprising installing agents on the devices, wherein said identifying and continuously monitoring is by the agents.

4. The method of claim 1 further comprising terminating the first process after terminating all initiated and spawned processes of the first process, based on a determination that the first process is a non-system process.

5. The method of claim 1, wherein the security incident alert indicates that the first process was not initiated or spawned by a second process.

6. The method of claim 1 further comprising identifying the first process as malware based, at least in part, on determining that the first process is a non-system process.

7. The method of claim 1, wherein marking the subset of DLLs and the subset of threads as malicious comprises:
   determining DLLs and threads on the first device;
   determining a chain that includes the first process, the subset of the threads, and the subset of the DLLs; and
   marking the subset of DLLs and the subset of threads as malicious based on determining the first process is a non-system process and in the chain.

8. The method of claim 1, wherein validating the security incident alert comprises validating the security incident alert based on a determination that the first process is a non-system process.

9. The method of claim 1, wherein determining the type of each process comprises at least one of determining if each process is initiated at the boot of a corresponding one of the devices and determining if each process is fatal for operation of the corresponding device.

10. The method of claim 1 further comprising verifying that the security incident alert is a false positive based on determining that the first process is not a non-system process.

11. The method of claim 1, wherein determining whether the first process is a non-system process to validate the security incident alert comprises determining the type of process which initiated or spawned the first process.

12. One or more non-transitory machine-readable storage media having program code for causality identification and attributions determination of one or more processes in an enterprise network, the program code executable by a hardware processor to:
   identify the one or more processes initiated after boot of at least a first device of a plurality of devices in the enterprise network;
   continuously monitor the plurality of devices in the enterprise network to collect data about initiated and spawned processes on the plurality of devices in the enterprise network and to determine dynamic link libraries (DLLs) and threads associated with respective processes from the one or more identified processes;
   determine whether a first process on the first device in the enterprise network is a major system process, minor system process, or non-system process based, at least in part, on analysis of the collected data indicating an association with a previously identified process; and
   based on receipt of a security incident alert,
      validate the security incident alert based on whether the security incident alert corresponds to a non-system process; and
      mark a subset of DLLs and a subset of threads on the first device as infected based on a determination that the subset of DLLs and subset of threads are associated with the first process, wherein the first process was initiated following the boot of the first device and was not initiated by a second process.

13. The non-transitory machine-readable media of claim 12 further comprising program code to install agents on the plurality of devices, wherein said identification and continuous monitoring is by the agents.

14. The non-transitory machine-readable media of claim 12, wherein the security incident alert indicates that the first process was not initiated or spawned by a second process.

15. The non-transitory machine-readable media of claim 12 further comprising program code to identify malware based, at least in part, on determining that the first process is a non-system process.

16. The non-transitory machine-readable media of claim 12, wherein the program code to mark the subset of DLLs and the subset of threads on the first device as infected comprises program code to:
   determine a chain of DLLs and threads on the first device that hosts the first process;

determine a chain from the first process that includes the subset of the threads and the subset of the DLLs; and attribute the subset of DLLs and the subset of threads to the first process.

17. The non-transitory machine-readable media of claim 12 further comprising program code to validate the security incident alert based on a determination that the first process is a non-system process.

18. The non-transitory machine-readable media of claim 12 further comprising program code to determine that the security incident alert is a false positive based on determining that the security incident alert does not correspond to a non-system process.

19. An apparatus for causality identification and attributions determination of one or more processes in an enterprise network comprising:

a hardware processor; and a machine-readable storage medium having program code executable by the hardware processor to cause the apparatus to, identify the one or more processes initiated after boot of at least a first device of a plurality of devices in the enterprise network;

continuously monitor the plurality of devices in the enterprise network to collect data about initiated and spawned processes on the plurality of devices in the enterprise network and to determine dynamic link libraries (DLLs) and threads associated with respective processes from the one or more identified processes;

determine whether a first process on the first device in the enterprise network is a major system process, minor system process, or non-system process based, at least in part, on analysis of the collected data indicating an association with a previously identified process; and based on receipt of a security incident alert, validate the security incident alert based on whether the security incident alert corresponds to a non-system process; and mark a subset of DLLs and a subset of threads on the first device as malicious based on a determination that the subset of DLLs and subset of threads are associated with the first process, wherein the first process was initiated following the boot of the first device and was not initiated by a second process.

20. The apparatus of claim 19, wherein the program code executable by the hardware processor to cause the apparatus to mark the subset of DLLs and the subset of threads as malicious comprises program code executable by the hardware processor to cause the apparatus to:

determine DLLs and threads on the first device that hosts the first process;

determine a chain from the first process that includes the subset of the threads and the subset of the DLLs; and attribute the subset of DLLs and the subset of threads to the first process.

21. The apparatus of claim 19 further comprising program code executable by the hardware processor to cause the apparatus to install agents on the plurality of devices, wherein said identification and continuous monitoring is by the agents.

22. The apparatus of claim 19 further comprising program code executable by the hardware processor to cause the apparatus to terminate the first process based, on a determination that the first process is a non-system process, after the first of the devices resets, wherein the first process was initiated on the first device.

23. The apparatus of claim 19 further comprising program code executable by the hardware processor to cause the apparatus to identify malware based, at least in part, on a determination that the first process is a non-system process.

24. The apparatus of claim 19, wherein the program code executable by the hardware processor to cause the apparatus to determine whether the first process on the first device in the enterprise network is a major system process, minor system process, or non-system process comprises program code to determine at least one of whether the first process was initiated at boot of the first device and whether the first process is fatal for operation of the first device.

25. The apparatus of claim 19 further comprising program code executable by the hardware processor to terminate the first process after termination of initiated and spawned processes of the first process, based on a determination that the first process is a non-system process.

26. The apparatus of claim 19 further comprising program code executable by the hardware processor to cause the apparatus to determine that the security incident alert is a false positive based on a determination that the security incident alert does not correspond to a non-system process.

27. The apparatus of claim 19, wherein the security incident alert indicates that the first process was not initiated or spawned by a second process.

* * * * *